June 24, 1969  KUNITOSHI TEZUKA  3,451,190
DEVICE FOR REFUSE DISPOSAL
Filed Aug. 3, 1966  Sheet 1 of 2

INVENTOR.
Kunitoshi Tezuka
BY
Agent

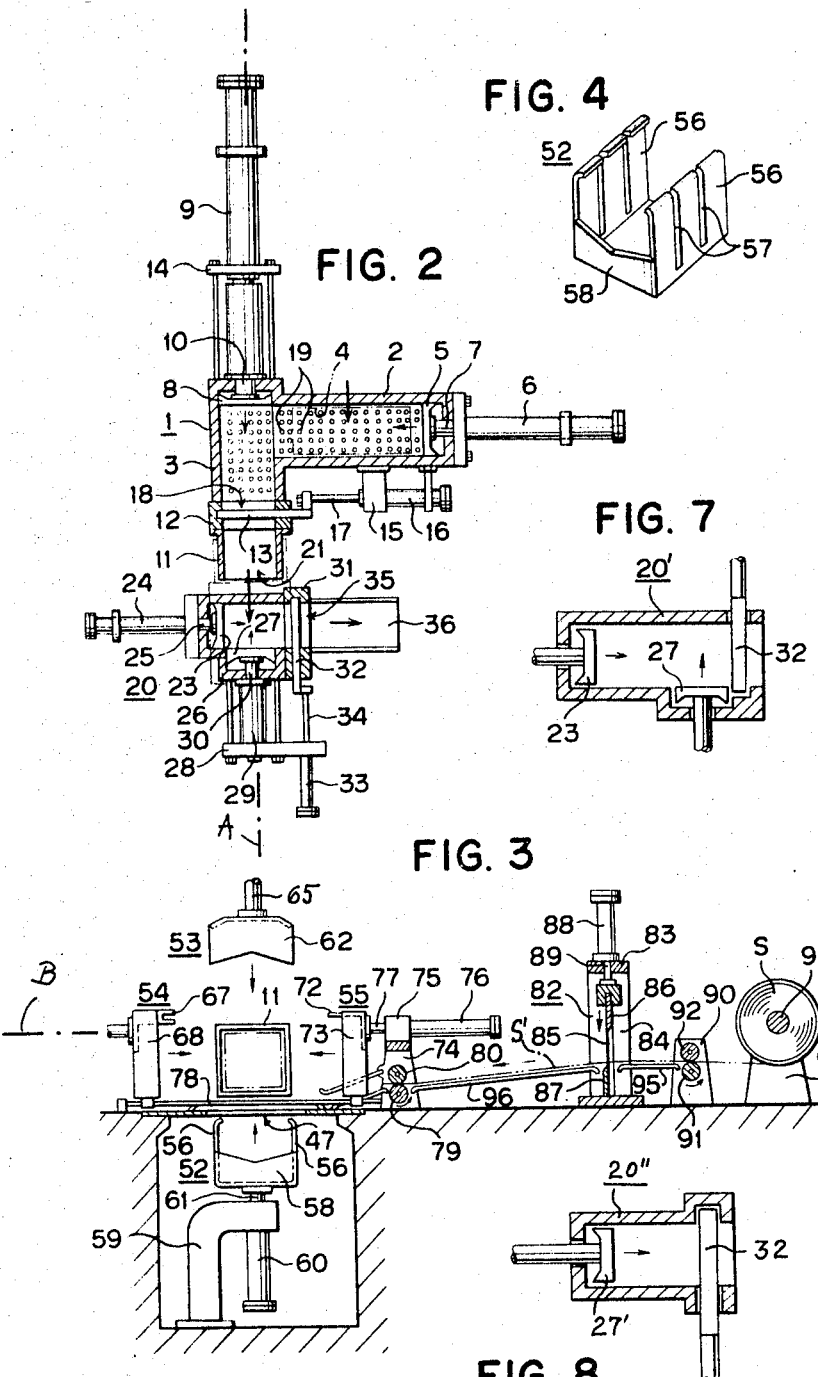

United States Patent Office 3,451,190
Patented June 24, 1969

3,451,190
DEVICE FOR REFUSE DISPOSAL
Kunitoshi Tezuka, Tokyo, Japan, assignor to Tezuka Kosan Kabushiki Kaisha, Tokyo, Japan
Filed Aug. 3, 1966, Ser. No. 569,991
Claims priority, application Japan, Feb. 23, 1966, 41/10,471
Int. Cl. B65b 1/24, 11/48; B30b 9/06
U.S. Cl. 53—124                    19 Claims

ABSTRACT OF THE DISCLOSURE

Device for refuse disposal by compression applied to the refuse, particularly of garbage, trash, waste and the like, comprising means for compressing the refuse into substantially solid refuse blocks of predetermined shape, and wrapping means for applying a cover to the solidified refuse blocks.

---

The present invention relates to a device for refuse disposal by compression applied to the refuse, such as garbage, trash, waste and the like, especially from kitchens, food processing factories, food stores or the like, daily discharged in huge quantities.

The amounts of refuse discharged nowadays in highly populous urban areas, and in the industrial mass production of foods, are quite substantial so that the effective disposal of refuse is an increasingly critical and important problem when aiming at maintaining proper environmental sanitation.

As a heretofore known example of refuse disposal, incineration should be mentioned which, however, is too expensive in view of the large amounts of fuel as well as time that has to be spent, particularly when disposing of wet garbage since it consumes much larger amounts of fuel. Moreover, the discharged soot, smut or noxious gases produced due to incomplete combustion will give rise to atmospheric pollution.

The underground or underwater dumping of refuse, another example of hitherto practised means or manner of disposal, requires vast spaces for burying the refuse in its original, unaltered condition, as collected; this would evidently result in most unsanitary conditions which have to be avoided.

It is one of the major objects of the present invention to provide a device for refuse disposal by solidifying the refuse into dehydrated, compact, substantially solid blocks of fixed size, convenient and suitable for disposal and/or use in a utilitarian manner in the reclamation of sea or river embankments and the like, for underground or underwater submersion; alternately, economical and sanitary incineration of the refuse blocks is also possible.

Another object of the invention is to provide a refuse disposal device having means for solidifying the refuse into solid blocks having a predetermined dimension, and being compactly wrapped up or packed with an appropriate cover material.

Still another object is to provide such a device having means for packing such blocks with a sheet-like elongated piece of said packing or covering material.

In accordance with one of the major features of the inventive device for refuse disposal, a preliminary solidifying means is provided for shaping the refuse into substantially solid blocks, by applying compressive forces; packing means for wrapping the blocks with a packing cover; and a secondary solidifying means for applying further compressive forces to the shaped and wrapped blocks, so that the packing cover tightly adheres to the compressed blocks.

Preferably, both the preliminary and the secondary solidifying means consists of a compression box and of a force plate or the like member adapted to reciprocate in said box.

The solidfying means applied according to the present invention are adapted so as to make use of suitable compressive forces depending upon different kinds of refuse to be disposed of, or upon the purpose or use to which the compacted refuse blocks are to be put, also considering the final means of disposal and/or other factors. For example, if the blocks are to be submerged under the sea, one or both solidifying means are provided with a powerful compressive force so as to compress or compact the refuse into relatively hard blocks having an apparent specific gravity allowing the blocks to sink readily underwater. If, however, blocks are to be made for ordinary incineration, the applied force may be much smaller than in the former case, just enough to make the blocks combustible yet easily transportable, if necessary. For this reason, the conventional drive means for actuating the force plates of the solidifying means may optionally be provided with oil-pressure cylinders, water-pressure cylinders, and other suitable expedients best adapted for the particular purpose.

As to the wrapping cover for the blocks, plastic sheets such as vinyl chloride, polyethylene or the like may be used, reinforced preferably with wire netting or the like; also, sheet-like covers may be used such as plastic sheets, metallic foils, with or without reinforcement as mentioned before. Alternately, reticular covers such as wire nettings, strips of canvas, steel bands or the like may also be employed. If it is important to shut off offensive odors, film-like wrapping covers are used; however if this is not required, such as in direct incineration, the reticular cover is suitable.

According to the present invention, tremendous piles of refuse may be compacted and compressed so that the moisture is squeezed out to a substantial degree, whereupon the compacted blocks are wrapped up with the cover, so that solid, easily portable blocks are obtained which have a very small volume. When such blocks are buried underground or underwater, sanitary disposal of the refuse is achieved within a limited space; when incinerated, expenses are greatly reduced and operations will become most efficient. Moreover, the compacted refuse blocks may be used to develop land by reclaiming from the sea, from rivers, and the like.

It should be noted that the present invention relates to an exemplary device, for disposing of refuse, according to applicant's co-pending patent application filed on even date, entitled "Method of Refuse Disposal," Ser. No. 569,987. While said other application covers various other procedural steps suitable for that inventive method, the present application relates only to an exemplary, preferred device for carrying out that method.

The present invention will be better understood, and additional advantages thereof will become more apparent, upon perusal of the following description of the aforementioned preferred embodiment thereof, taken in conjunction with the appended drawings, wherein FIG. 1 is a perspective view of the device for refuse disposal, according to the present invention;

FIG. 2 is a cross-sectional view of a major portion of the device, including a preliminary compression box and a secondary compression box, taken in a substantially horizontal plane along axis A of FIG. 1;

FIG. 3 is an expanded, vertically cross-sectional view of another major portion of the device, including a wrapping mechanism, taken in a substantially vertical plane along axis B of FIG. 1;

FIG. 4 is a perspective view of a wrapping clamp used in the device;

FIGS. 7 and 8 are cross-sectional views schematically showing alternative details of the device, namely compression boxes of modified design.

Figure 1:
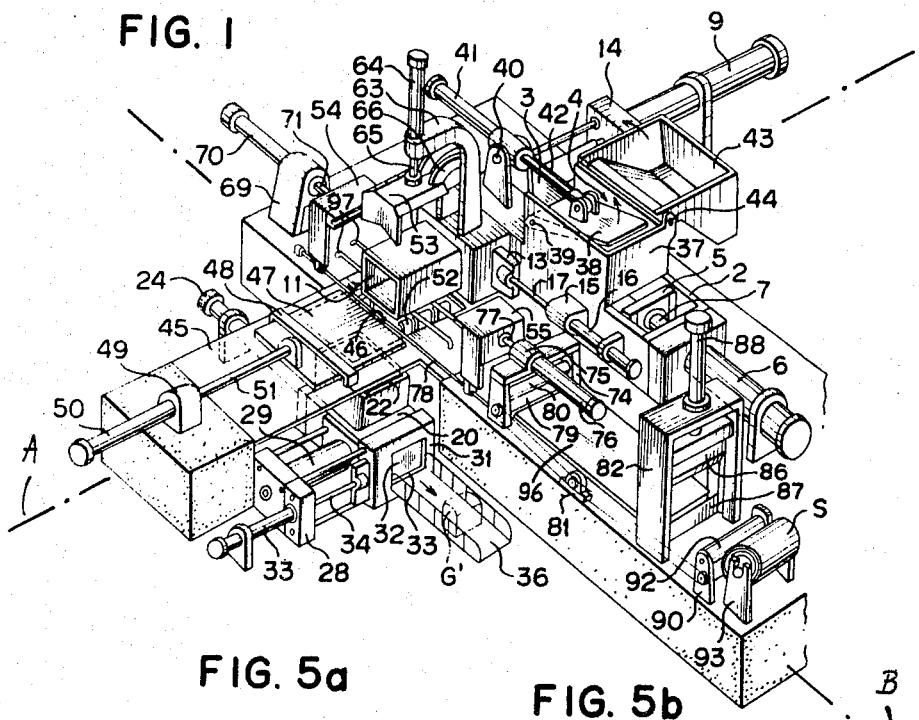

It will be seen from the drawings that FIGS. 1 and 2 have common axis A, and that FIG. 2 constitutes a partly sectional planar view of certain portions of the device shown in FIG. 1 in its entirety. A preliminary compression box 1 includes a square-shaped feeder box 2 and a compression box 3, disposed at right angles with respect to each other. The bottoms of the boxes 2, 3 are provided with a number of holes 19 for discharging water, as will be explained somewhat later. The top of box 2 is provided with an inlet 4 through which the refuse and other materials to be compacted are introduced. It should be noted that the holes 19 may also be provided on the side walls of the boxes.

A force plate 5 is slidably inserted in the feeder box 2, which is connected to the fore end of a ram 7 of a preferably oil-pressure cylinder 6 mounted onto the outer end of box 2. When a hydraulic fluid is introduced into the cylinder 6 in a conventional manner, the force plate 5 slides forward and backward, in a freely reciprocable manner within box 2.

In the compression box 3, there is slidably inserted a force plate 8 which is connected to a ram 10 of an oil-pressure cylinder 9, similar to cylinder 6 and mounted onto the end of the box 3 with a support 14, so disposed that by virtue of the action of the cylinder 9 said force plate 8 may reciprocate toward and into a square-shaped guide cylinder 11 connected with the open end of box 3.

Between the box 3 and the guide cylinder 11, a door frame 12 is mounted into which a slide door 13 is inserted from the outside. The door 13 is connected with a ram 17 of an oil-pressure cylinder 16 held by a bracket 15, which is adapted to open and shut an opening 18 between the box 3 and the guide cylinder 11, by the action of the cylinder 16.

As to the operation of the described structural elements, the force plate 5 will pressure-feed the refuse, thrown into the feeder box 2, into the compression box 3 wherein the force plate 8 will then exert a powerful preliminary compression force against the refuse, toward the door 13, so that the refuse is now substantially solidified. The moisture squeezed out from the refuse is discharged from the box through the holes 19; the discharged dirty water can be gathered in a conventional manner and led to a sewer through proper draining means not requiring further description in connection with the inventive device. It will be understood that force plate 5 is preferably left in its furthermost, advanced position while force plate 8 is actuated.

In the preliminary compression box 1, there is a housing 37 (see FIG. 1) with the afore-mentioned inlet 4. A lid 38 of the inlet is mounted on one side of the housing 37 with a pivot 39, and an oil-pressure cylinder 41 is swingably carried by a bracket 40 on top of the compression box 3. The fore end of a ram 42 of said cylinder 41 is swingably connected to the top of the lid 38 which is thus opened and shut by the action of said cylinder. A hopper 43 is mounted onto one side wall of the housing 37 with a pivot 44, and is adapted to rotate alternately upwardly and sideways of the inlet 4, by the action of an oil-pressure cylinder or similar means (not illustrated in the drawing). The cylinder may be similar to those described herein.

Reverting to FIG. 2, a second compression box 20 is shown, as a matter of example, as having substantially the form of a rectangular parallelepiped, one side of which is provided with a small chamber 26 connected thereto. The box 20 is disposed in a substantially rectangular direction with respect to the preliminary compression box 3, but at an adequately lower position than an outlet 21 of the guide cylinder 11, there being an inlet 22 provided on the top of said box 20. The spatial arrangement of these parts is visible in FIG. 1. In the box 20, there is slidably inserted a force plate 23 which is connected to a ram 25 of an oil-pressure cylinder 24 mounted onto one end of the box 20, and it is so devised that on the action of said cylinder 24 the force plate 23 reciprocally slides within the secondary compression box 20.

Further, another force plate 27 is inserted into the chamber 26 and is connected to a ram 30 of an oil-pressure cylinder 29 mounted onto the chamber 26 with a support 28. The force plate 27 is adapted to reciprocally slide in a direction substantially perpendicular to that in which the afore-mentioned force plate 23 can move.

The open end of the box 20, opposite to the elements 23–25, is connected with a door frame 31 into which is inserted a sliding door 32 connected to a ram 34 of an oil-pressure cylinder 33 mounted to said support 28, for opening and shutting an opening 35 of the secondary compression box 20 when the cylinder 33 is actuated, a bridge 36 being provided outside the opening 35.

Once the pre-compressed refuse block has reached the box 20, on its way from the compression box 3 through the guide cylinder 11, it is subjected to a powerful secondary compressive force within said box 20, so as to solidify the refuse block while a packing cover is made to adhere thereto, as will be explained later in more detail.

There is provided, with a substantially horizontal extension, a floor plate 45 between the guide cylinder 11 and the inlet 22 of the secondary compression box 20, and said floor plate 45 is provided with an oblong window 46 which extends from the lower part of the cylinder 11 to the upper part of the inlet 22. There is inserted a lid 47 into a sliding frame 48 over the portion corresponding to the inlet 22, in a slidable manner, and said lid 47 is connected with a further ram 51 associated with an oil-pressure cylinder 50, borne by a bracket 49, so as to slide and reciprocate said lid 47, thus selectively opening and shutting the portion corresponding to the inlet of the window 46.

In the following, the wrapping means will be described as follows: Reference will now be had to FIGS. 1 and 3, and it will be seen from the drawings that these figures have a common axis B, and that FIG. 3 constitutes a partly vertically sectioned view of certain portions of the device shown in FIG. 1 in its entirety. It will be explained how a sheet-formed packing cover of a certain length is wound around the compacted refuse block, radially in four directions, vertically and horizontally, from the guide cylinder 11, by means of clamps 52, 53, 54 and 55 (shown in both FIGS. 1 and 3).

FIG. 4 shows clamp 52 alone, made from a resilient plate of steel or the like in a channel shape, as shown. On the sides, there are wrapping strips 6 having each two vertically notched slits 57, and being bent slightly inwardly at their top edges; there is also provided a so-called choking piece 58 in sheet form, approximately at the lower part of the front end of the channel-shaped clamp plate, the upper margin of the piece 58 being formed into a slight V-shape.

As shown in FIG. 3, clamp 52 is secured to the upper end of a ram 61 of an oil-pressure cylinder 60 held by a bracket 59 underneath the guide cylinder 11. When raised, the clamp 52 passes the window 46 and engages the two sides of the guide cylinder while the choking piece 58 protrudes and covers the front opening of the cylinder 11; upon its descent, the clamp 52 will resume its original position.

Coming now to clamp 53, which has a shape different from that of clamp 52, it is located above the cylinder 11 and has a downwardly directed choking piece 62 similar in shape to the afore-described piece 58 of clamp 52. Clamp 53 is secured to a ram 65 (FIG. 1) of an oil-pressure cylinder 64 borne by a bracket 63 having a channel shape; on the action of the cylinder 11, the clamp 53 moves down, makes its piece 62 protrude to the front of the cylinder 11 (as does piece 58), and upon upward movement, resumes its original position.

When the clamps 52 and 53 are moved simultaneously toward each other to the clamping position, the choking pieces 58, 62 partially overlap (see FIG. 5d to be explained later). As shown in FIG. 1, an arcuate guide 66 is disposed at the rear of clamp 53, and this guide, located within the channel configuration of the afore-mentioned bracket 63, serves to maintain the position of clamp 53 when moving upwards.

As the clamps 52, 53 are respectively located below and above the guide cylinder 11, as can be seen from FIG. 3, the third clamp, identified by numeral 54, is located to the left-hand side, as viewed in FIG. 3, and has a channel-shaped clamping piece 67 facing the cylinder, and a sheet-formed choking piece 68 suspended therefrom on the front side. As shown in FIG. 1, the clamp 54 is secured to a ram 71 of an oil-pressure cylinder 70 supported by a bracket 69. Owing to this arrangement, the clamp 54 may reciprocate to and from the cylinder 11; when it advances, the clamping piece 67 protrudes to and above the upper surface of said cylinder, for reasons to be explained hereunder, while the choking piece 68 is positioned in front of the cylinder 11 (see FIG. 5c).

Finally, the clamp 55 is located opposite the previously described clamp 54 (on the right-hand side of the cylinder 11, as viewed in FIG. 3). The clamp 55 has a mortise-engaging tenon-shaped clamping piece 72 engageable with the inside of the slot or mortise of the channel-shaped clamping piece 67, and a choking piece 73 similar to piece 68 of clamp 53. The clamp 54 is secured to a ram 77 of an oil-pressure cylinder 76 borne by a bracket 75 on a bearing frame 74 (see FIG. 3), for reciprocation toward and from the cylinder 11. All clamps 52–55 clear the cylinder 11 in the rear (see FIG. 4 with clamp 52 cut away opposite front piece 58).

Figure 5A:
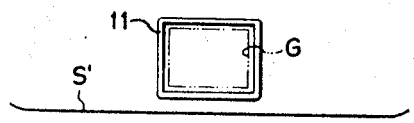
FIGS. 5a to 5d are frontal views each schematically showing another operational phase of the device, with the afore-mentioned clamp.
Figure 5B:
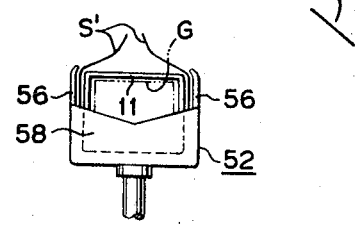
Figure 5C:
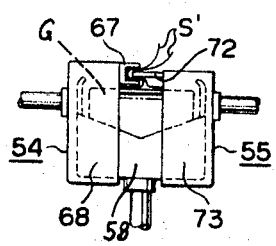

When the clamps 54 and 55 are moved simultaneously toward each other to the clamping position, the clamping pieces 67, 72 will engage each other on top of the cylinder 11, as shown in FIG. 5c. FIG. 3 shows that the lower ends of the pieces 68, 73 of the respective clamps 54, 55 are in sliding engagement with a guide rod 78 substantially horizontally installed on either side and underneath the normal position of the cylinder 11, for maintaining the clamp positions during their back-and-forth movement.

Now the means for cutting elongated sheet-like packing covers into proper lengths and feeding them to the underside of the guide or packing cylinder 11 will be described as follows: Again with reference to FIGS. 1 and 3, the frame 74 supports a pair of vertically aligned rollers 79, 80; the bottom roller 79 is being rotatable by a motor 81. In FIG. 1, a simple driving connection has been shown, by way of an endless cord or the like; this, however, is given only as a matter of example, and other conventional driving means may be provided, including gears, frictional members and the like, between the motor 81 and the driven elements, like roller 79.

A cutter 82 is provided farther away from the rollers 79, 80, at a distance shorter than the required length of the packing cover. A gate-type frame 83 has lateral columns 84 provided with grooves 85 on their inner sides; a cutting knife 86 is slidable in the grooves while another knife, identified by numeral 87, is mounted onto the lower part of the frame 83. The knife 86 is connected to a ram 89 of an oil-pressure cylinder 88 mounted on the top of the frame 83, so as to be elevated and dropped at will, for carrying out a shearing action with the other knife 87.

Farther to the right from the cutter mechanism 82, there is another pair of rollers 91, 92 attached to a frame 90, the bottom roller 91 being also driven by the motor 81, as illustrated in FIG. 1. A reel supporting frame 93 is still farther to the right-hand side (FIG. 3), adapted to carry a reel 94 wound with a length of a cover sheet S. Guide plates 95, 96 are disposed between the feeding rollers 91, 92 and the cutter 82, and also between the latter and the delivery rollers 79, 80, underneath the path of the packing cover or sheet S toward the guide cylinder 11. For the sake of clarity, plate 95 has been omitted from FIG. 1.

Two rods 97 are extended over the window 46, somewhat inwardly from the guide rods 78 (see FIG. 1), for carrying the packing sheet to the refuse block to be wrapped. FIG. 1 also shows that the spacing of the rods 97 corresponds to that of the vertical slits 57 in the clamp 52 so that the latter may be moved up and past the level of the rods 97 since they will be cleared by said slits.

When the motor 81 is energized and the sheet S from reel 94 is pulled out and advanced by the feed rollers 91, 92, the sheet will pass the cutter mechanism 82 so as to reach the delivery rollers 79, 80 over the guide plate 96. It will be understood by those skilled in the art that at this point, a predetermined length S' of packing cover or sheet passes the rollers 79, 80 rather than the continuous sheet S (see FIG. 3). Cutting occurs, by operating the cylinder 88 and thus lowering the knife 86, followed by its subsequent raising to the normal position, when the length of the sheet S between the delivery rollers 79, 80 and the cutting knives 86, 87, or that past these rollers and underneath the cylinder 11, has become long enough for wrapping a refuse block compacted in the preceding stages of the inventive device. The operation is repeated, the cut cover sheet S' being delivered one by one underneath the cylinder 11 while the continuous sheet S passes the cutter 82 over the feed rollers 91, 92.

The rotational speed and operation of the motor 81, the respective distances between the structural elements, and the control operations (e.g. those for actuating cylinder 88 of the knife 86) are predetermined so that a cyclical operation is ensured, in unison with the operational phases of the other operative elements. The motor 81 will, for instance, stop when the cut cover sheet S' leaves the delivery rollers 79 and 80. The next cut sheet follows after an appropriate pause during which the actual packing or wrapping is performed.

The operational phases can best be explained with reference to FIGS. 5a through 5d and FIG. 6. In FIG. 5a, a block of refuse G is shown, already compressed in the preliminary compression box 1, as located in the guide cylinder 11; the cut piece of cover sheet S' is fed thereunder by the mechanism shown in FIG. 3. When the clamp is raised (preferably simultaneously with the lowering of the clamp 53), its winding strips 56 will wrap or wind the sheet S' around the cylinder 11, as shown in FIG. 5b. The block of refuse G is of course inside the cylinder.

Next, when the clamps 54, 55 are made to advance toward the cylinder 11, their choking pieces 68, 73 will hold both ends of the sheet S', as shown in FIG. 5c, and engage one another. Thereafter both clamps are retracted to their respective original positions, the two ends of the sheet S' being now interleaved and superimposed, by the cooperation of the mortise- and tenon-type clamping pieces 67 and 72. The fore end of the sheet will be slightly tucked or choked inwardly by the interaction of the afore-mentioned pieces 68, 73.

Figure 5D:
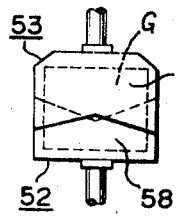

When the clamp 53 is lowered, as shown in FIG. 5d, the overlapping joining action of the respective choking pieces 58, 62 of clamps 52, 53 tucks inside the front end of the sheet S', blocking up the hitherto open front of the square-shaped sheet. Next, the clamps 52, 53 are withdrawn and the refuse block G pushed out from within the cylinder 11, so as to be inserted into or surrounded by the folded sheet S'; the block and the sheet are then discharged from the cylinder 11 in the form of an almost completely wrapped refuse block, identified as G'. This is possible since the rear flap of the cover sheet S' is still loose while the others (front and sides) are already wrapped or wound around the refuse block.

Figure 6:
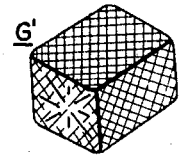
FIG. 6 is a perspective view of a compacted refuse block made with the inventive device.

Finally, the clamps 52, 53 are advanced once more so that their corresponding choking pieces 58, 62 reach the partly overlapping position shown in FIG. 5d, thereby blocking the rear part of the refuse block. Thus, the wrapped block G' is completed, as shown in FIG. 6, consisting of the compacted refuse block G completely wrapped around or wound in the pre-cut sheet S'.

The operation of the exemplary, preferred device for refuse disposal according to the invention will be described in a continuous manner. Referring to FIG. 1, it will be understood from the foregoing that the refuse itself travels from the right-hand top corner of the illustration toward the left-hand bottom corner, the packing station being substantially at the center (at the guide cylinder 11), while the two compressing stages straddle the same. The packing cover or sheet, in turn, travels from the right-hand bottom corner toward the left-hand top corner, to the packing station where the pre-cut sheet S' meets the compacted refuse block G so as to be united therewith, forming the completed refuse block G'.

The collected refuse is thrown into the hopper 43 and when a sufficient amount is accumulated therein, the lid 38 is opened and the hopper 43 pivoted so that the refuse is thrown into the feed box 2 through the inlet 4. The cylinder 6 is put in action so as to advance the force plate 5 whereby the refuse is advanced and pushed into the compression box 3. Hereafter the cylinder 9 is operated so as to advance the force plate 8; the refuse is now powerfully compressed toward the door 13 so that a dehydrated, substantially solid block G is obtained which has the predetermined shape of the box 3.

By operating the cylinder 16, the door 13 is opened and the force plate 8 is advanced further, up to the line of the door, whereby the refuse block is pushed into the guide cylinder 11. In this condition, and at this location, the successive steps of wrapping the cover sheet S' around the cylinder 11, the clamping of both ends thereof, and the subsequent choking and blocking of the frontal part are carired out, as has been described before, followed by advancing the force plate 8 up to the outlet 21 of the cylinder 11 so as to discharge the completed and wrapped block G' onto the lid 47. This is followed by the last actuation of the clamps 52, 53, resulting in the choking and blocking of the rear part of the refuse block.

The lid 47 is now opened by the action of the cylinder 50 so that the wrapped block G' is thrown into the secondary compression box 20, past the window 46 and the inlet 22. Thereafter the cylinder 29 is operated so as to advance the force plate 27 and again powerfully compress or compact the refuse block G' so that preferably a cube-shaped block is achieved which has been further solidified and has the cover sheet S' tightly adhering thereto.

Upon withdrawing the force plate 27, the cylinder 33 is operated so as to open the door 32, the cylinder 24 is energized for advancing the force plate 23 up to said door, whereby the block G' is delivered out onto the bridge 36.

The compacted blocks G' can be loaded on trucks and/or transported in any conventional and suitable manner to a reclamation site (sea embankment or the like), to a dumping area or an incineration plant, for effective utilization or disposal of the refuse blocks.

Alternative details of the inventive device will be described in the following. FIG. 7 shows a modification with a secondary compression box 20' that is longer than box 20 of FIG. 2. When the packed refuse block G' is dropped into the box 20', the force plate 23 advances the same to a compression location somewhat farther away; the force plate 27 then exerts the powerful secondary compression, as in the previously described device, followed by the block being discharged from the box 20' by another, more advanced, movement of the plate 23 upon having opened the door 32. Since the force plate 27 is closer in this instance to the door 32 than with box 20, the showing of FIG. 7 has the direction of door movement reversed (from the top rather than from the bottom, as viewed in the drawing), without however affecting the operation of the refuse disposal device in other respects.

FIG. 8 shows another modified compression means which actually could be either the preliminary or the secondary compression box. As a matter of example, a box 20'' is shown wherein the displacing force plate (23 in FIGS. 2 and 7) has been omitted or rather replaced by a compacting force plate 27', similar to the previously described plate 27 of the other embodiments. Both powerful secondary compression and advancing or delivery can be performed with this modified system. It will be understood that an appropriate cylinder and a reciprocable ram is provided for force plate 27', much like those shown at 24, 25 for the above-mentioned plate 23.

This second modification, when applied to the preliminary compression box, would constitute the omission of the force plate 5, together with the feeder box 2, or only by itself. In the former case, the inlet 4 may be provided in the compression box 1, and the force plate 8 would then handle both the advancing and the preliminary compression of the refuse. Those skilled in the art can easily substitute the illustration of FIG. 8 for either the box 20 or the box 1 of FIG. 2, and for this reason no separate illustration of this alternative modification has been provided.

It should be noted that for the sake of clearer illustration, no feed conduits to and from the respective oil-pressure cylinders have been shown in the various figures. These, however, are conventional, and so are control means, like valves, means for providing oil or other hydraulic fluid under pressure, and so on. Also, the invention contemplates the provision of manual, semi-automatic or fully automatic control means for consecutively, independently or simultaneously energizing and disenergizing the various operating cylinders. These operations will no doubt be clear from the preceding structural and operational descriptions of the exemplary, preferred embodiment of the inventive device, and thus no illustration has been provided of the control means for said device.

The invention also contemplates a simplified device wherein the pre-cut cover sheet S' is applied manually to and around the previously compacted refuse block G, dispensing in essence with the winding or wrapping station as shown in the left-hand portion of FIG. 3. In such a case, the sheet may previously be formed or cut into a square shape and even inserted into the guide cylinder 11 before the refuse block G is introduced thereinto.

While the feed and delivery rollers 91, 92 and 79, 80 have been shown with a motor drive 81, it should be understood that similar mechanical or electrical drive means may be used for any or all of the operated elements (force plates 5, 8, 23, 27 etc.; doors 13, 32; clamps 52 to 55; knives 86, 87, etc.), substituting the illustrated oil-pressure cylinders (6, 9, 24, 29; 16, 33; 60, 64, 70, 76; 88, etc., in the above sequence of the operated elements). If the drive means are, for example, reversible electric motors or other actuators, a common electric or electro-mechanical control board may be provided in connection with, or in lieu of, the above-mentioned control means for the inventive device. In either the hydraulic or the electric control alternative, timers may also be provided for correlating the operating periods of the various operated elements, so as to satisfy a continuous and highly efficient operation in which the individual cycles or operational phases follow each other without interruptions.

It is also considered to be within the scope of the present invention to use a single compressing means in conjunction with the packing means, omitting the secondary compressing means for cases where less of a compression is acceptable, or where operating costs or time is a decisive factor. In such an arrangement, the once compacted and then wrapped refuse blocks could be discharged right from the packing station; an appropriate discharge bridge (similar to that shown at 36) may thus follow the guide cylinder 11, either in a permanent fashion (in lieu of the lower portion of FIG. 2, from the secondary compression box 20 downward), or in an easily attachable and removable manner, for occasional use only.

The foregoing disclosure relates only to preferred, exemplary embodiments of the invention, which is intended to include all changes and modifications of the examples described, within the scope of the invention as set forth in the appended claims.

What I claim is:

1. A device for refuse disposal by compression, comprising, in combination, means for compressing the refuse into substantially solid refuse blocks of predetermined shape, reducing thereby its volume and increasing its apparent specific gravity, and wrapping means for applying a cover around said refuse blocks, wherein said compressing means includes preliminary and secondary solidifying means respectively disposed before and after said wrapping means.

2. The device as defined in claim 1, wherein said wrapping means is adapted to handle a cover consisting of a reticular material.

3. The device as defined in claim 1, wherein said wrapping means is adapted to handle a cover consisting of a sheet-like plastic material.

4. The device as defined in claim 3, wherein said sheet-like material is reinforced with a reticular material.

5. The device as defined in claim 1, wherein at least one of said solidifying means includes a compression box with a first force plate reciprocable therein lengthwise for advancing said refuse and a second force plate reciprocable crosswise for compacting said refuse.

6. The device as defined in claim 5, wherein said compressing means further includes a feeder box communicating with and adjoining said compression box and having an inlet for said refuse to be introduced thereinto.

7. The device as defined in claim 5, wherein said compression box is provided with reciprocable door means, closely adjacent said second force plate, for discharging said refuse upon completion of said compacting operation.

8. The device as defined in claim 1, wherein said preliminary solidifying means and said wrapping means are substantially at the same horizontal level while said secondary solidifying means is at a lower level.

9. The device as defined in claim 6, wherein said door means is disposed at the end of said compression box opposite to that where said first force plate is disposed, and further comprising a guide cylinder associated with said end of the compression box, adapted to pass said refuse blocks to said wrapping means.

10. The device as defined in claim 1, further comprising means for feeding an elongated sheet material to said wrapping means, and means for cutting predetermined lengths of said sheet material so as to form said cover for said refuse blocks.

11. A device for refuse disposal by compression, comprising, in combination, means for compressing the refuse into substantially solid refuse blocks of predetermined shape, reducing thereby its volume and increasing its apparent specific gravity, wrapping means for applying a cover around said refuse blocks, means for feeding an elongated sheet material to said wrapping means, and means for cutting predetermined lengths of said sheet material so as to form said cover for said refuse blocks, wherein said compressing means includes a guide cylinder for passing said refuse blocks to said wrapping means, and wherein said feeding means includes guide means for bringing the cut lengths of sheet material underneath said guide cylinder.

12. The device as defined in claim 11, wherein said wrapping means includes at least one pair of wrapping clamps reciprocable towards and away from said guide cylinder for temporarily applying thereto said cut lengths of sheet material which will constitute said cover around each refuse block while they rest within said guide cylinder.

13. The device as set forth in claim 12, wherein said wrapping clamps are disposed on diametrally opposite sides of said guide cylinder and have protruding complementary portions adapted to interleave the terminal portions of said cover when said wrapping clamps engage said guide cylinder and apply said cover thereto.

14. The device as set forth in claim 12, wherein said wrapping clamps are disposed below and above said guide cylinder and have frontal portions at least partly overlapping one another when said wrapping clamps engage said guide cylinder and apply said cover thereto.

15. The device as set forth in claim 12, wherein said wrapping means includes two pairs of wrapping clamps respectively disposed below, above and on two sides of said guide cylinder, for alternately and successively pressing respective flaps of said cover against the respective portions of said guide cylinder.

16. The device as set forth in claim 12, further comprising control means allowing said compressing means, said wrapping means, said feeding means, said cutting means and said wrapping clamps to be selectively operated independently from each other so as to achieve continuous operation of the device.

17. The device as set forth in claim 16, wherein said control means includes at least one timer means for regulating the length of the operational cycles of the device.

18. The device as defined in claim 8, wherein said secondary solidifying means has an inlet at its top, the covered refuse blocks being passed from said wrapping means to said inlet in a substantially downward direction.

19. The device as defined in claim 18, further comprising a slidable lid for said inlet, operable upon completion of the wrapping operation and before starting the secondary solidifying operation.

References Cited

UNITED STATES PATENTS

| | | | |
|---|---|---|---|
| 2,537,920 | 1/1951 | Smith | 25—12 |
| 3,266,214 | 8/1966 | Kramme | 53—122 |
| 3,277,850 | 10/1966 | Jackson et al. | |
| 3,330,088 | 7/1967 | Dunlea | 53—24 |

TRAVIS S. McGEHEE, *Primary Examiner.*

U.S. Cl. X.R.

100—127, 218, 232

PO-1050
(5/69)

UNITED STATES PATENT OFFICE
CERTIFICATE OF CORRECTION

Patent No. 3,451,190                Dated June 24, 1969

Inventor(s) Kunitoshi Tezuka

It is certified that error appears in the above-identified patent and that said Letters Patent are hereby corrected as shown below:

Claim 9, line 1 (column 9, line 50), change "6" to -- 7 -

SIGNED AND
SEALED
SEP 30 1969

(SEAL)
Attest:

Edward M. Fletcher, Jr.
Attesting Officer

WILLIAM E. SCHUYLER,
Commissioner of Paten